Nov. 6, 1951 — W. G. WILSON — 2,574,080
VALVE
Filed Oct. 1, 1945 — 2 SHEETS—SHEET 1
Fig. 1
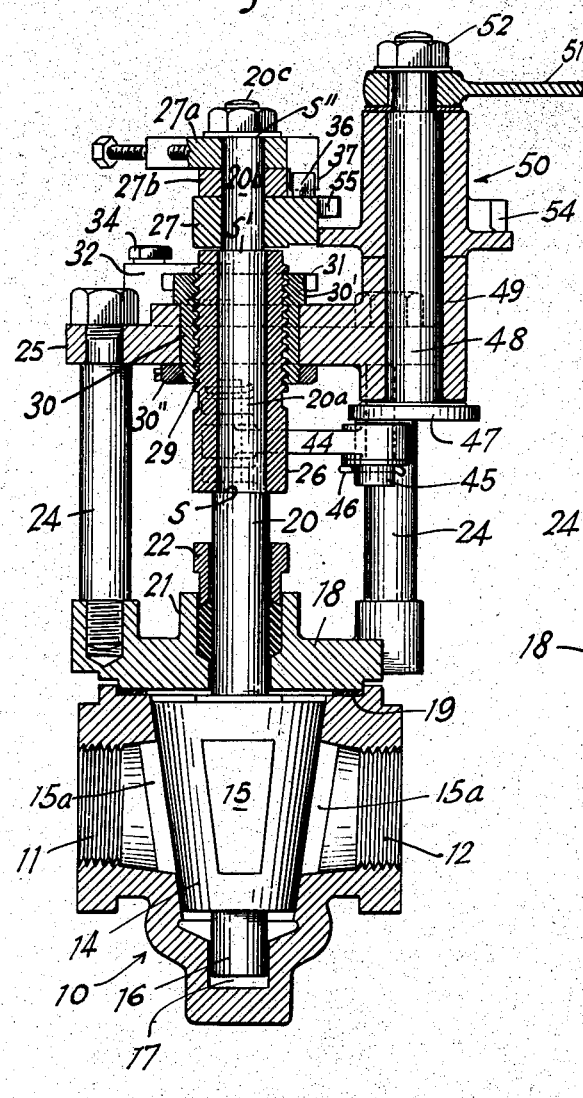
Fig. 2
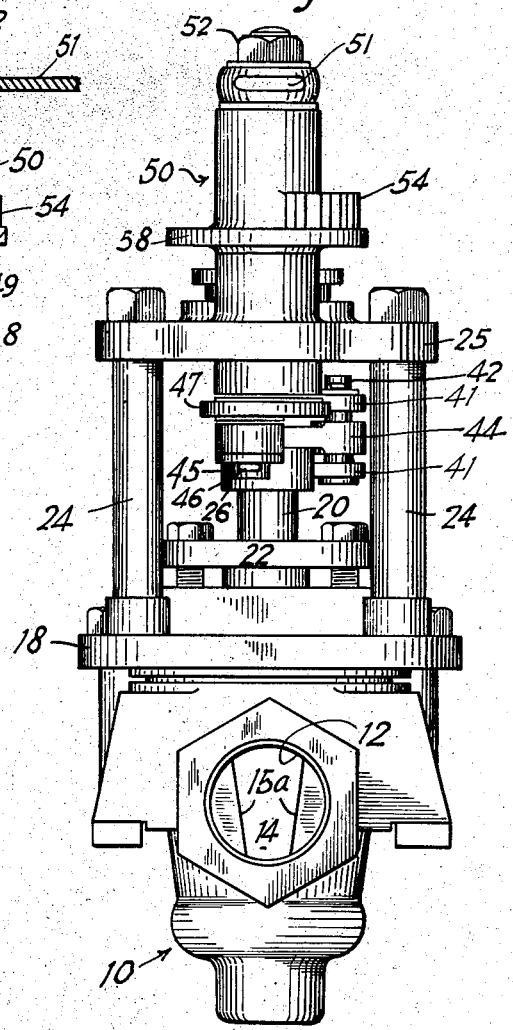
Fig. 3
INVENTOR
Wylie G. Wilson
BY
Ramsey, Kent & Chisholm
ATTORNEYS Nov. 6, 1951 W. G. WILSON 2,574,080
VALVE
Filed Oct. 1, 1945 2 SHEETS—SHEET 2
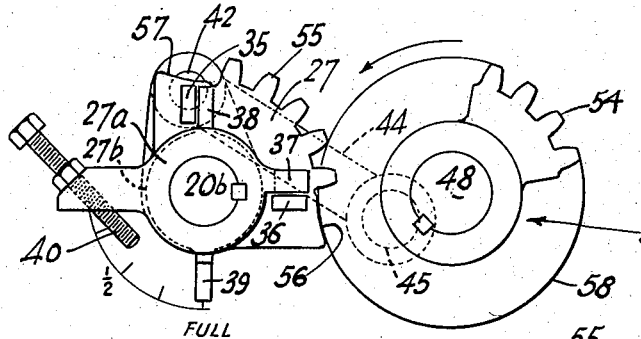
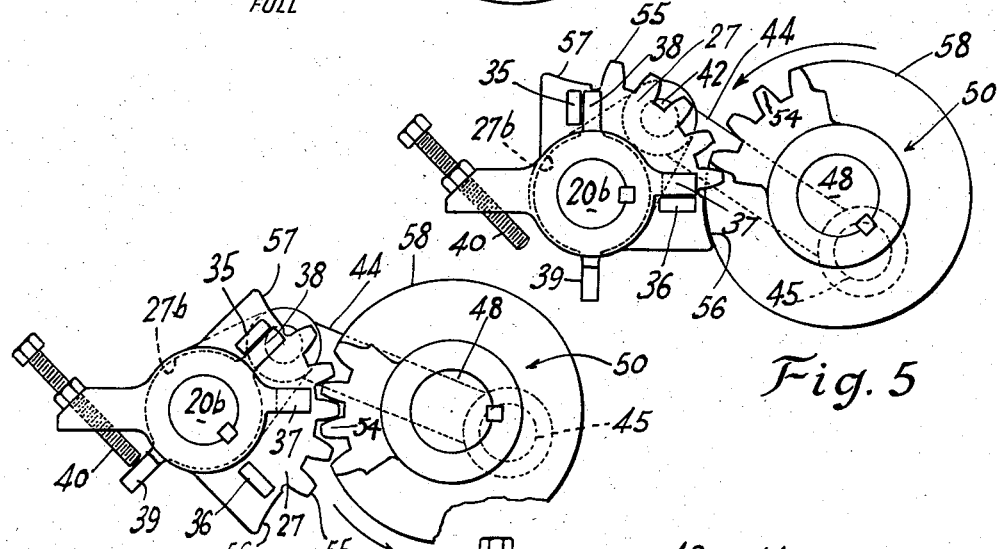
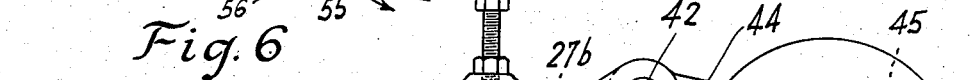
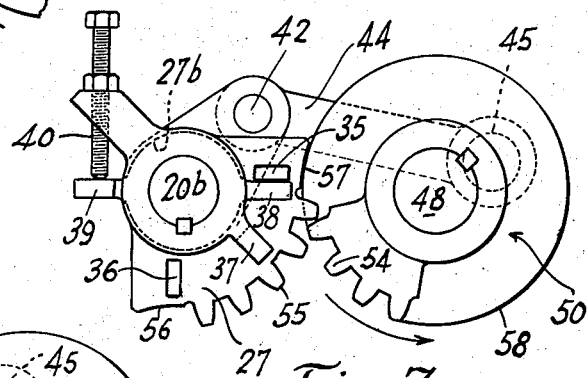
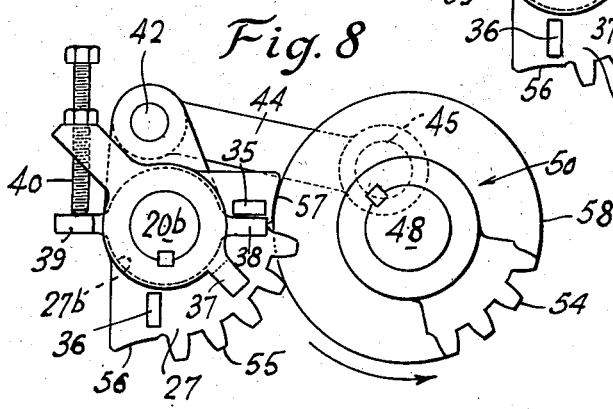
INVENTOR
Wylie G. Wilson
BY
Ramsey, Kent + Chisholm
ATTORNEYS Patented Nov. 6, 1951

2,574,080

UNITED STATES PATENT OFFICE 2,574,080

VALVE

Wylie G. Wilson, Elizabeth, N. J., assignor to Everlasting Valve Company, Jersey City, N. J., a corporation of New Jersey Application October 1, 1945, Serial No. 619,640

3 Claims. (Cl. 251—97)

1

This invention relates to valves. It is particularly applicable to valves of the type known as plug cocks; and in some respects it is an improvement on the valve disclosed in my reissue Patent No. 22,455, dated March 14, 1944.

An object of the present invention is to provide a valve structure with improved operating mechanism of the type in which continuous movement of an operating member in one direction lifts the valve element from its seat, then rotates the valve element to a desired open or closed position, and then reseats the valve element.

A particular object of the invention is to provide a valve of the foregoing character which provides for reseating of the valve element in any rotative position thereof.

Another object of the invention is to provide valve operating mechanism of the foregoing character which lifts the valve element from its seat without rotary movement thereof, which restores the valve element to its seat without rotary movement thereof during the restoring movement, and which provides for seating of the valve element in partially open positions.

A further object of the invention is to provide a valve structure of the foregoing character which includes means whereby the position of the plug or other valve element in the valve casing can be adjusted to compensate for wear or other condition and be securely locked in adjusted position without change of adjustment during the act of locking.

Further objects, and objects relating to details and economies of construction and use will more definitely appear from the detailed description to follow.

The valve disclosed includes a casing and a tapered plug therein, which plug has a through opening adapted to be aligned with openings in the valve casing. In the drawings the plug is illustrated as having a stem passing through a sleeve in such fashion that the stem is held against axial movement relative to the sleeve, but may be rotated relative to the sleeve. This sleeve is threaded into a second sleeve rotatably secured into a supporting part of the valve framework. Rotation of the first sleeve in one direction will cause axial movement of the stem in one direction while rotation of the same sleeve in the opposite direction will cause reverse axial movement of the stem. Rotative adjustment of the second sleeve effects axial adjustment of the first sleeve, and consequently of the stem and plug.

Rotary movement of the first sleeve is accomplished through the agency of a connecting rod, one end of which is attached to an arm extending outwardly from the sleeve, and the other end of which is attached to a crank member. This crank member is mounted on an operating shaft for over-center movement thereby, so that rotation of the shaft in one direction causes rotation of the sleeve, first in one direction and then in the opposite direction. In conjunction with the connecting rod arrangement just described, the operating shaft is provided with a mutilated gear or sector which cooperates with a gear sector mounted on the valve stem. The various parts are so related that upon rotation of the operating shaft in a single direction, the valve element is first lifted from its seat, then rotated, and then reseated.

The mechanism additionally includes an adjustable lost-motion connection between the gear sector and the valve stem, whereby the degree of rotation of the stem occasioned by complete movement of the operating shaft in a single direction may be controlled. Thus the invention provides for partial opening of the valve to the extent that may be desired, while at the same time providing for seating of the valve element at the end of movement of the operating shaft regardless of the degree of opening of the valve.

Fig. 1 is a vertical section of a valve structure embodying the invention.

Fig. 2 is an elevation of the same structure, viewed from the right of Fig. 1.

Fig. 3 is a diagram showing the relative positions of certain parts of the valve operating mechanism during the cycle of operation thereof.

Figs. 4 to 8 are largely diagrammatic plan views illustrating successive increments of movement of some of the operating parts of the mechanism during a complete cycle of operation thereof.

Referring particularly to Figs. 1 and 2 of the drawings, 10 indicates generally the body of a valve of the plug cock type. This body has threaded openings 11 and 12 to receive pipes for the passage of fluid to be controlled by the valve. The body of the valve is so shaped and ground interiorly as to provide a seat for a tapered plug member 14 which has a port 15 therein of size and shape to match the ports 15a, 15a in the valve body. In addition, the lower end of the plug may be provided with a stub stem member 16 journalled in a bearing recess 17 in the valve body for the purpose of aiding in centering the plug, but this may be omitted if desired. A cover or bonnet 18 is secured in any suitable way to the valve body, with an interposed gasket 19. This cover is centrally apertured for the passage of a valve stem 20. A stuffing box for the reception of packing 21 is provided in the cover and a packing compressor 22 is pressed into the box in a usual manner.

Secured to the cover 18 by means of shouldered studs 24 is a plate 25 utilized in supporting the mechanism for operating the valve. Above the packing compressor 22 the valve stem 20 is provided with successive portions 20a, 20b and 20c of successively reduced diameter. The successive reductions in stem diameter form shoulders at S, S' and S''. A sleeve 26 embraces stem portion 20a. Mounted on stem portion 20b is a gear sector 27 and elements 27b and 27a, which will be referred to later. Stem portion 20c is threaded and is provided as shown with a nut which holds a washer firmly against the stem shoulder at S''. The parts are so proportioned that sleeve 26, gear sector 27 and elements 27b and 27a are confined against axial movement on the valve stem without binding or clamping action between them.

The sleeve 26 is externally threaded as at 29 to coact with internal threads of a second or adjusting sleeve 30, which second sleeve is rotatable in an aperture in the plate 25. Sleeve 30 is held against axial movement in plate 25 by a bearing shoulder 30' and a retaining nut 30''.

The upper end of the adjusting sleeve is provided with a flange in which teeth 31 are cut. Cooperable with the teeth 31 is a dog 32 mounted on a pivot stud 34 secured to the plate 25. This dog is adapted to be moved into engagement with the teeth 31 to lock the adjusting sleeve 30 in any rotative position. This structure is more fully shown and described in my reissue patent No. 22,455, hereinbefore mentioned. By means of the adjusting sleeve 30, the plug 14 may be conveniently seated with the desired degree of pressure, when the valve is initially assembled and also if readjustment becomes desirable due to wear. After such an adjustment the dog 32 is moved into its locking position between teeth 31 and secured by a cotter pin, as disclosed in Re. 22,455, to prevent fortuitous rotation of sleeve 30.

The sleeve 26 is provided with two outwardly extending lugs 41, 41 (Fig. 2) through which extend a pin 42 that secures one end of a connecting rod 44 to the sleeve. The lugs 41, 41 are spaced apart a distance greater than the thickness of the connecting rod so that, as the sleeve 26 rotates with combined axial movement, relative sliding movement between the connecting rod (which does not move axially of the valve stem 20) and the pin 42 is permitted. The other end of the connecting rod 44 has a crank pin 45 extending therethrough and the connecting rod is retained on the crank pin by a split cotter pin 46. The crank pin 45 is fastened to a crank disc 47 on the lower end of an operating shaft 48 which is journalled in a bearing 49 formed as part of the plate 25. The upper end of the operating shaft 48 has a mutilated gear, or gear sector, 50 keyed thereon and held against axial movement by a handle 51 which is fast on shaft 48 and retained by a nut 52 threaded onto the upper end of the shaft 48. Both the handle 51 and the gear sector 50 are so secured to the operating shaft 48 that these parts must rotate as a unit.

The gear sector or pinion 50 has teeth 54 formed thereon as shown in Fig. 2 and such teeth extend through an arc of somewhat less than 90°. The gear member 27 on the stem 20 has teeth 55 extending through a sector of nearly 90°. The member 27 also has locking formations 56 and 57 (see also Figs. 4–8) adjacent the ends of the teeth 55, which locking formations engage the lower periphery or disc 58 of the pinion 50 to hold gear member 27 against rotation when teeth 54 and 55 are out of mesh. The disc 58 is spaced axially from the teeth 55 to prevent contact between these parts when the gear 27 moves axially.

Gear sector 27, which is not keyed to valve stem 20, may move through an angle of approximately 90° under the action of gear sector 50. On the upper face of gear sector 27 are two integral upstanding lugs 35 and 36. Extending downwardly into the path of movement of lug 36, as it moves with gear sector 27, is a lug 37 (see particularly Fig. 1) on element 27a which is keyed on the upper end of stem 20. Between gear sector 27 and element 27a is the floating member 27b, which has a lug 38 which extends into the path of movement of lug 35 on gear sector 27. Element 27b also has a lug 39 which extends upwardly into the path of adjusting screw 40 carried by element 27a. These elements constitute an adjustable lost-motion connection between gear sector 27 and element 27a which is keyed to valve stem 20. The operation of this structure is illustrated in Figs 4 to 8 inclusive.

Fig. 4 illustrates the position of pinion member 50 and its cooperating gear sector 27 when the valve is closed, the arrow indicating the direction of movement on moving the handle 51 and the operating shaft 48 to open the valve. Fig. 5 shows the position of pinion member 50 at the beginning of its action on gear sector 27.

Further motion will cause rotation of gear sector 27, and its upstanding lug 35 will immediately contact lug 38 on floating element 27b, causing that element also to rotate. In Fig. 6 is shown the position when upstanding lug 39 on floating element 27b has come into contact with adjustable screw 40 carried by element 27a. Continued rotation will cause lug 39 to push screw 40 and thereby rotate element 27a to the position shown in Fig. 7. In this position the gear sectors 50 and 27 disengage, and locking shoulder 57 comes into engagement with disc 58 on the pinion member 50. Thereafter pinion member 50 may continue to rotate, but gear sector 27 and all its associated parts will remain stationary with the valve open to the extent determined by the adjustment of set screw 40. Further movement of the handle 51 and the operating shaft 48 in the same direction will have an effect to be hereafter described, which will not involve further rotation of the valve plug 14.

It being understood that Fig. 8 shows the position of the valve operating mechanism when the valve is open to the extent determined by the setting of screw 40, movement of the operating shaft 48, in the direction opposite to that shown by the arrows, will have no effect in rotating gear sector 27 until the pinion member 50 has reached the position shown in Fig. 7. Further reverse movement of the operating shaft will initiate reverse rotation of gear sector 27. As soon as upstanding lug 36 contacts depending lug 37 the element 27a will be rotated and will in turn rotate valve stem 20 until it reaches the position shown in Fig. 5. In this position the teeth of the pinion member 50 become disengaged from gear sector 27, leaving gear sector 27 locked against rotation by shoulder 56, the plug 14 now being in closed position.

Referring now to Fig. 3, the arc A represents the path of movement of the center of the pin 42 to which one end of the connecting rod 44 is pivotally secured. The point B represents the axis of the valve stem 20, and the point C represents the position of the axis of pin 42 when the valve is closed and the plug is seated. The points D and E represent points in the travel of the axis of pin 42. The point F represents the axis of the operating shaft 48, while the points G, H, I, J and K represent points in the travel of the axis of the crank pin 45. The lines C—G, D—H, E—I, D—J, and C—K represent the connection between the pins 42 and 45, i.e., the connecting rod 44 in various positions.

Assuming that the valve is closed, in which condition the plug is seated, a cycle of operation to open the valve requires a movement of the operating handle 51 through approximately 270°, from point G to point K. During the first 90° of movement of the operating handle the crank pin 45 moves from G to H. This moves the sleeve pin 42 along the arc from C to D, with corresponding rotation of the sleeve 26. Such rotation of the sleeve 26 in the stationary sleeve 30 imparts relatively rapid axial movement to the valve stem 20 to quickly lift the plug 14 from its seat. Movement of the crank pin 45 from H to I (dead center) moves the sleeve pin 42 only from D to E, which imparts only a slight additional increment of lifting movement to plug 14. Continued movement of crank pin 45 from I to J causes a reverse movement of the sleeve pin 42 from E to D, which slightly depresses the plug 14. During the last 90° of movement of the crank pin 45, from J to K, the sleeve pin 42 is moved from D to C and the plug 14 quickly reseated. During the second 90° of movement of the crank pin 45, from H to J, rotation of the valve stem 20 is effected to open the valve, as will now be described.

Bearing in mind the schematic showing of Fig. 3, reference will now be made to Figs. 4 to 8 inclusive, which figures illustrate five positions of the operating mechanism during the movement of the valve from closed position to open position. In Fig. 4 the connecting rod 44 is in the position corresponding to line C—G in Fig. 3. In this position the teeth 54 of the pinion 50 are out of mesh with the teeth 55 of the gear 27, and this latter gear is locked against rotation by contact between the formation 56 and the disc 58 of the pinion member 50.

When the operating handle or lever 51 has moved through the initial 90° of movement, the parts assume the Fig. 5 position, in which the teeth 54 of the pinion are just coming into mesh with the teeth 55 of the gear 27. In this Fig. 5 position the connecting rod 44 is in the position corresponding to line D—H in Fig. 3, and the plug 14 has been lifted from its seat. In the Fig. 6 position the connecting rod 44 is in the position corresponding to line E—I in Fig. 3. In moving from the Fig. 5 to the Fig. 6 position, little additional lifting of the plug has taken place, but gear 27 has been rotated approximately 45°. In the Fig. 7 position the connecting rod 44 is in the position corresponding to line D—J of Fig. 3. In moving from the Fig. 6 to the Fig. 7 position, the plug has been depressed slightly and the gear 27 has been rotated a further increment of about 45°. In the Fig. 8 position the connecting rod 44 is in the position corresponding to line C—K of Fig. 3. In moving from the Fig. 7 to the Fig 8 position, no additional rotation has been imparted to gear 27, but the plug 14 has been reseated.

Thus it will be seen that the valve opening cycle may be considered as being composed of four steps. During the first step (Fig. 4 to Fig. 5) gear 27 is held against rotation by the contact of formation 56 with disc 58, and the plug is lifted without rotation thereof. During the second and third steps (Fig. 5 to Fig. 6 and Fig. 6 to Fig. 7) the gear 27 is rotated approximately ¼ turn to rotate plug 14 and only slight idle up and down movement of plug 14 occurs. During the fourth step (Fig. 7 to Fig. 8) gear 27 is held against rotation by the contact of formation 57 with disc 58, and the plug is reseated without rotation. The ¼ turn of gear 27 will impart a ¼ turn or full opening movement to plug 14 if screw 40 be fully extended to hold lug 39 at 90° from lug 37, i. e., if screw 40 be so set as to eliminate all lost motion between parts 27b and 27a. By whatever amount screw 40 is set to permit lost motion between parts 27b and 27a, by just that amount does the gear sector 27 rotate idly, with corresponding reduction in the amount of opening rotation that is imparted to plug 14 as the parts move from the Fig. 5 position to the Fig. 7 position. Thus the mechanism is one which can unseat the plug, turn it to fully open position and then reseat it, but which additionally provides for reseating of the plug in any partially open position.

Closing of the valve requires simply a reverse movement of the operating handle 51 through 270° or a movement of the crank pin from the position K to the position G in clockwise direction. Such reverse movement of the operating handle causes a reversal in the sequence of operation just described for opening the valve.

From the foregoing it will be seen that the present invention provides new, simple and efficient mechanism for operating a plug cock valve in such fashion that the valve can be moved from closed position to any selected degree of opening from a mere crack to fully open position, the valve element being unseated before the opening movement starts, and being reseated after the selected degree of opening movement has been accomplished.

Though the operating mechanism has been described in connection with a valve utilizing a tapered plug, it will be evident that this operating mechanism can be used with valves of other construction.

In compliance with the patent statutes I have disclosed the best form in which I have contemplated applying my invention, but it will be realized that the invention may be embodied in other forms of mechanism which will achieve similar results.

What I claim is:

1. In a valve organization including a body having a bore forming a seat, inlet and outlet passages intersecting said seat, a rotary sealing member cooperating with said seat and arranged on rotation to control flow from said inlet to said outlet passage and to be shifted axially in said bore, a valve stem extending from said sealing member, and actuating means for said stem; said actuating means comprising: threaded sleeve means surrounding the stem and operable to unseat and reseat said sealing member; stem-rotating means associated with said stem and operable to rotate the stem; mechanism for rotating said sleeve means and moving said stem-rotating means in sequential relation to unseat said sealing member in a first predetermined rotative position, then in unseated condition rotate the sealing member to a second predetermined rotative position, and then reseat the sealing member in said second rotative position, including a single operating member for operating said mechanism as aforesaid; the stem-rotating means being adjustable to effect reseating of said sealing member in rotated positions between said first and second rotated position.

2. In a valve organization including a body having a bore forming a seat, inlet and outlet passages intersecting said seat, a rotary sealing member cooperating with said seat and arranged on rotation to control flow from said inlet to said outlet passage and to be shifted axially in said bore, a valve stem extending from said sealing member, and actuating means for said stem; said actuating means comprising: threaded sleeve means surrounding the stem and operable to unseat and reseat said sealing member; rotating means associated with said stem and operable to rotate the stem; mechanism for rotating said sleeve means and moving said stem-rotating means in sequential relation to unseat said sealing member in a first predetermined rotative position, then in unseated condition rotate the sealing member to a second predetermined rotative position, and then reseat the sealing member in said second rotative position; and a single operating member for operating said mechanism as aforesaid; the stem-rotating means being constructed and arranged to provide an adjustable amount of lost motion between the single operating member and the valve stem to effect reseating of said sealing member in rotated positions between said first and second rotated position.

3. In a valve organization including a body having a bore forming a seat, inlet and outlet passages intersecting said seat, a rotary sealing member cooperating with said seat and arranged on rotation to control flow from said inlet to said outlet passage and to be shifted axially in said bore, a valve stem extending from said sealing member and actuating means for said stem; said actuating means comprising: threaded sleeve means surrounding the stem and operable to unseat and reseat said sealing member; stem-rotating means associated with said stem and operable to rotate the stem; mechanism for rotating said sleeve means and moving said stem-rotating means in sequential relation to unseat said sealing member in a first predetermined rotative position, then in unseated condition rotate the sealing member to a second predetermined rotative position, and then reseat the sealing member in said second rotative position; and a single operating lever for operating said mechanism as aforesaid; the stem-rotating means including a member rotatably mounted on the valve stem and capable of limited rotation thereon, the member being rotated through a predetermined angle by the single operating lever and being connected with the valve stem by a readily adjustable drive to produce any desired lesser rotation of the valve stem.

WYLIE G. WILSON.

REFERENCES CITED

The following references are of record in the file of this patent:

UNITED STATES PATENTS

| Number | Name | Date |
| --- | --- | --- |
| Re. 22,455 | Wilson | Mar. 14, 1944 |
| 2,144,305 | Brisbane | Jan. 17, 1939 |
| 2,327,425 | Hilker | Aug. 24, 1943 |